United States Patent [19]
Irland

[11] 3,736,119
[45] May 29, 1973

[54] GLASS FURNACE LIP-TILE

[75] Inventor: Frank W. Irland, Shreveport, La.

[73] Assignee: Libbey-Owen-Ford Company, Toledo, Ohio

[22] Filed: May 3, 1971

[21] Appl. No.: 139,637

[52] U.S. Cl..................65/204, 65/172, 65/196, 65/337, 65/203
[51] Int. Cl................................................C03b 5/20
[58] Field of Search..................65/171, 172, 196, 65/197, 198, 203, 204, 337, 338

[56] References Cited
UNITED STATES PATENTS 3,458,302   7/1969   Mambourg et al. ..................65/338 X
3,294,514   12/1966  Zellers, Jr...............................65/196

*Primary Examiner*—Arthur D. Kellogg
*Attorney*—Collins & Oberlin

[57] ABSTRACT

An improved lip-tile and mounting apparatus for use in the drawing chamber of a window glass furnace in which a plurality of axially aligned refractory segments are compressed together between end bearing plates and independently suspended from a continuous, fluid-cooled overhead beam. A recess provided along the bottom of the lip-tile contains an auxiliary radiant heating element. The rearward bottom edge of the lip-tile projects into a sealing member containing a body of loose granular material to thereby create an elongated seal between the pot chamber and the drawing chamber along the rear pot wall.

9 Claims, 6 Drawing Figures

INVENTOR.
Frank W. Irland
BY
Collins & Oberlin
ATTORNEYS

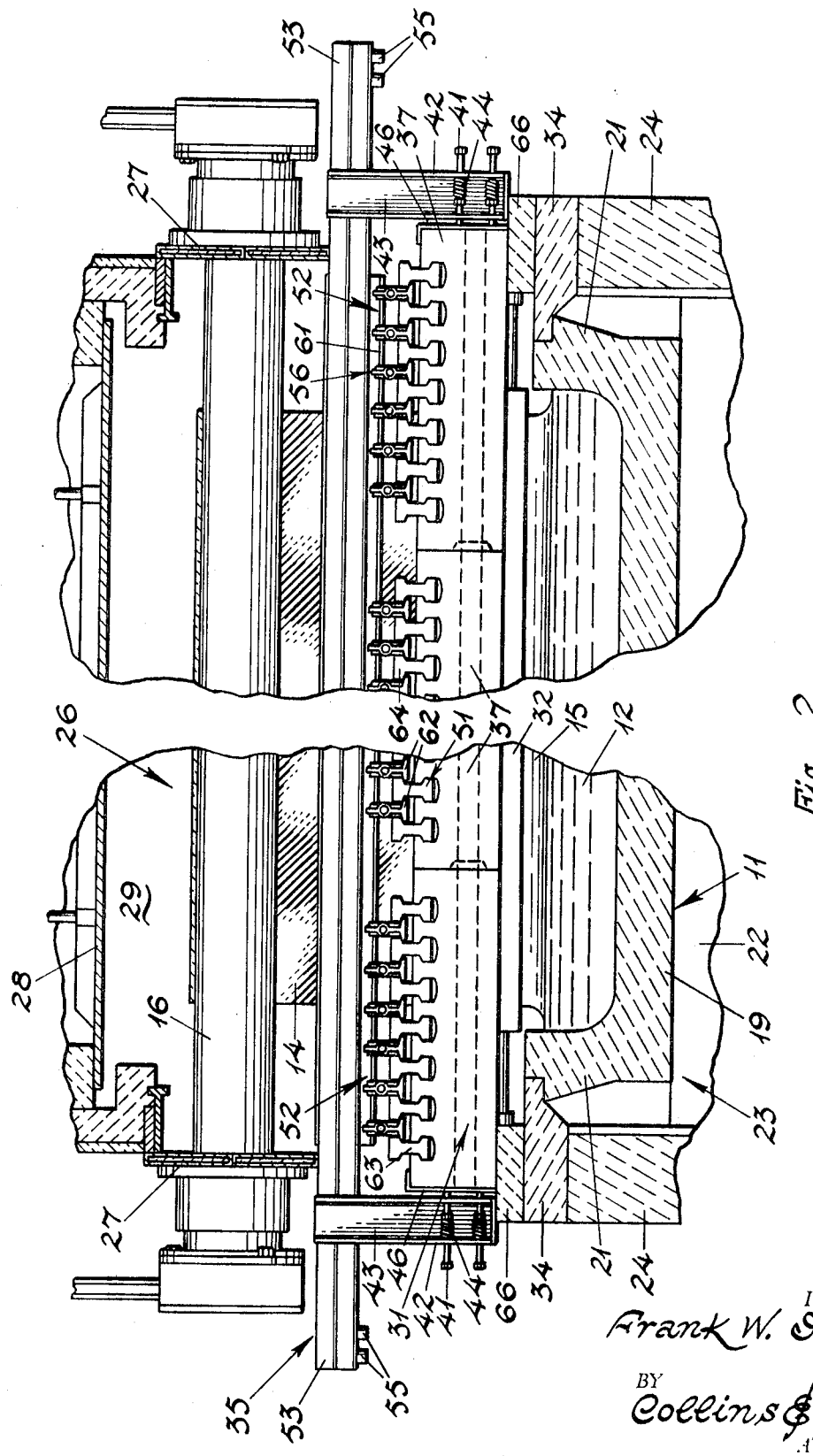

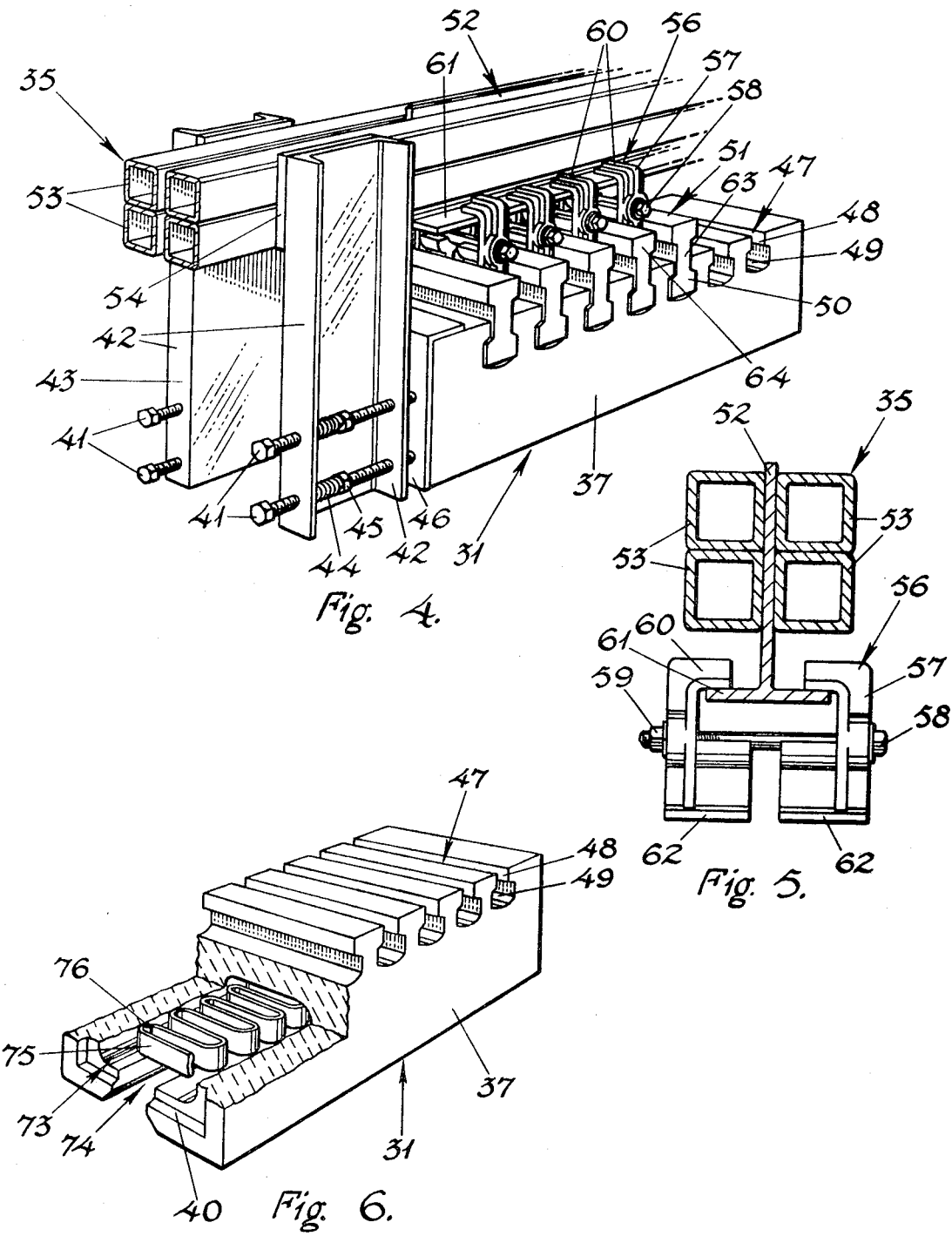

3,736,119

GLASS FURNACE LIP-TILE

BACKGROUND OF THE INVENTION

1. Field of the Invention

The present invention relates broadly to improvements in the drawing of sheet glass, and more particularly to an improved lip-tile and mounting which prevents warping and cracking of the tile when in use, thereby greatly increasing its useful life in the furnace.

2. Description of the Prior Art

The continuous drawing of sheet glass involves continually charging desired proportions of raw glass making materials into the melting area of a tank furnace containing a mass of molten glass, wherein such ingredients are also melted and become integrated into the molten mass. The molten mass moves progressively along the tank furnace through successive refining and cooling areas, ultimately reaching a working area from which it is withdrawn in sheet or ribbon form. According to the well-known Colburn process, for which the present invention is particularly well suited although by no means limited thereto, the working area is a relatively shallow receptacle or draw pot in open end-to-end communication with the cooling area of the tank furnace. Glass continually drawn upward from the molten mass in the draw pot travels vertically for a short distance and, while still in a highly heated, plastic condition although substantially set in its final sheet form, is deflected about a bending roll into a substantially horizontal plane and carried into and through an adjacent annealing lehr on a series of spaced horizontally aligned rolls.

The glass within the working receptacle or draw pot is maintained at the desired temperature for drawing by additional heating means which normally consist of conventional combustion burners firing directly into a pot chamber which encloses the area beneath and around the draw pot. The hot gaseous products of combustion flow upward across the outer surfaces of the draw pot transferring heat thereto in addition to that radiated by the hot pot chamber walls. In the past it was believed necessary to allow the hot gaseous products of combustion to flow freely up and over the rear wall of the draw pot into the drawing chamber to provide the glass adjacent to the rear pot wall with additional heat to prevent the formation of devitrified material in the area. These gases, however, are known to introduce harmful particles of dirt into the draw pot and chamber thereabove. Such particles are likely to enter the sheet and severely damage its quality. Also, the gases themselves cause turbulent conditions in the atmosphere above the molten glass and surrounding the newly formed sheet, resulting in undesirable temperature differentials within the chamber which, in turn, produce objectionable variations in thickness across the width of the sheet.

In the past, however, the prevailing viewpoint has been that the benefits derived from prevention of devitrification in the molten glass in the rear of the draw pot by allowing the hot gases to flow freely out of the pot chamber and across the rear section of the draw pot more than offset the defects such gases caused in the drawn sheet, and this remained the standard practice. More recent developments have partially alleviated this situation. Thus, it has been found that an auxiliary heating device placed above the rear pot wall can provide the necessary added heat input to the molten glass adjacent the rear pot wall to eliminate the need for the flow of the hot combustion gases in this area, thereby allowing the space between the top of the rear pot wall and the lip-tile to be sealed.

Such a device is illustrated and described in U.S. PAT. No. 3,458,302, granted July 29, 1969. As therein explained, an electric heating element may be mounted in a recess in the underside of the rear lip-tile or, in the alternative, on one of the component blocks forming the seal above the rear pot wall. Similar devices are also shown in U.S. PAT. No. 3,314,776, granted Apr. 18, 1967.

These devices, while representing substantial progress in the art, have not proved entirely satisfactory in all respects, however. Lip-tiles are normally formed of a relatively heavy ceramic refractory material cast in a single section which, when installed in the furnace chamber, is supported by a tubular member which passes through a central bore in the tile. The tubular member thus spans the width of the chamber and is, in turn, supported at its ends by structures outside the chamber. During use these lip-tiles have been observed to deflect as much as 1½ inches and, due to the intense heat of the chamber and their own substantial weight, they may in some instances become warped and cracked, allowing considerable leakage of gas through the seal. Also, the transverse sectional configuration of the tile limits the bore of the opening therein and thus restricts the diameter and strength of the support member extending therethrough, so that it may exhibit considerable deflection under the weight of the tile. As cracks develop in the tile, the deflection of the central portion of the support member increases, causing still greater gas leakage through the seal.

SUMMARY OF THE INVENTION

According to the present invention, the problem of deflection and cracking of the lip-tile is overcome and a positive seal is maintained between the pot chamber and the drawing chamber above the rear pot wall by means of an improved, axially segmented lip-tile suspended from a beam member traversing the chamber lengthwise of the lip-tile, the bottom edge of the tile extending into a trough containing loose granular material to provide a seal along the top of the rear pot wall. A radiant heater is included to heat the area adjacent the rear pot wall.

It is, therefore, a primary object of the invention to prevent deflection and cracking of the lip-tile in a sheet glass drawing apparatus.

Another object is to mount the lip-tile in a manner which creates no deflective stress on the lip-tile.

Another object of the invention is to seal off the draw pot area from the entry of gases from the pot chamber.

Still another object of the invention is to apply heat to the molten glass at the rear of the draw pot to maintain the desired temperature therein.

Other objects and advantages will become more apparent during the course of the following description when taken in connection with the accompanying drawings.

BRIEF DESCRIPTION OF THE DRAWINGS

In the drawings, wherein like numerals are employed to designate like parts throughout the same:

- FIG. 2 is an enlarged transverse sectional view of the working area taken substantially along line 2—2 of FIG. 1;

FIG. 4 is an enlarged fragmentary perspective view of the end portion of the lip-tile and mounting means;

FIG. 5 is an enlarged transverse sectional view of the mounting means of the invention; and FIG. 6 is a perspective view of one section of the lip-tile of the invention with parts cut away exposing the radiant heater.

DESCRIPTION OF THE PREFERRED EMBODIMENTS

Figure 1:
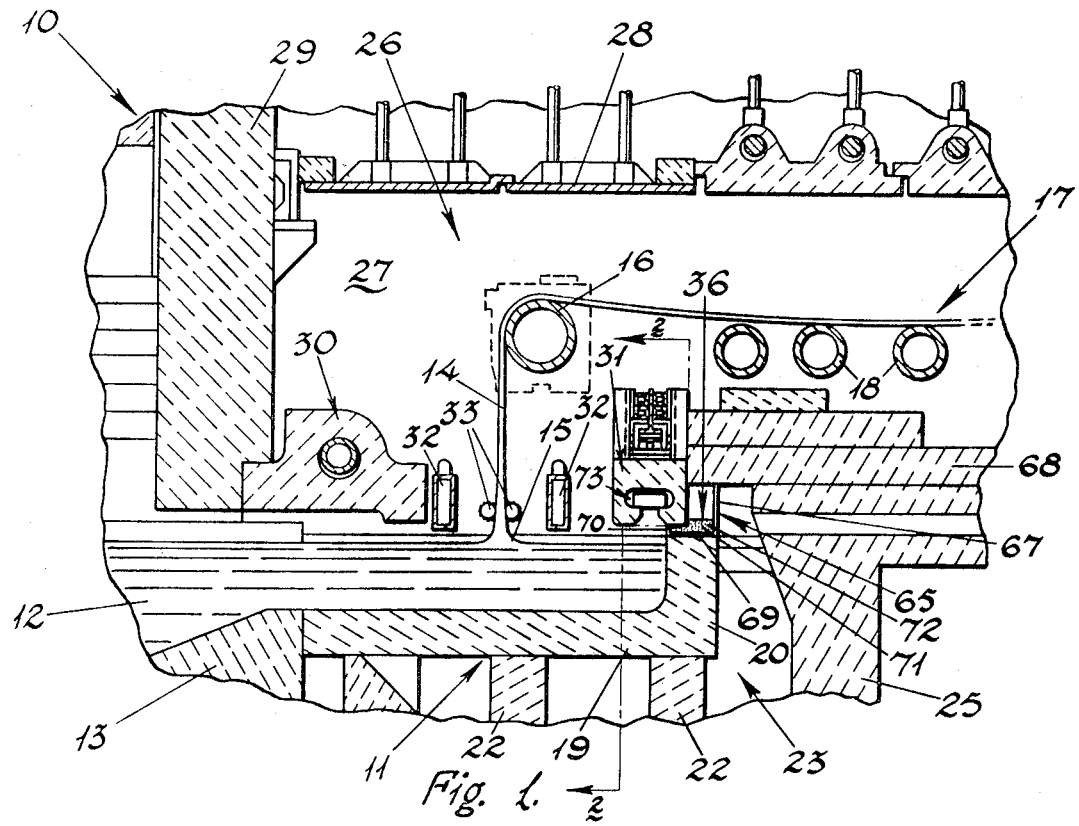
FIG. 1 is a partial longitudinal vertical sectional view of the working area of a sheet glass furnace and adja

Referring now to the drawings, and in particular to FIG. 1 thereof, there is shown generally at 10 the working end of a sheet glass furnace including a draw pot or working receptacle 11 containing a supply of molten glass 12. Before reaching the draw pot 11 the molten glass flows successively through melting and refining chambers (not shown) and a cooling chamber, the outlet end of which is shown at 13, where it is properly conditioned, and then into the draw pot maintaining therein a constant level of molten glass. A sheet or ribbon 14 is continually drawn up from the mass of molten glass contained in the draw pot through a meniscus 15 and, according to the Colburn process, after it has traveled a short distance vertically, the sheet is deflected about a bending roll 16 into a substantially horizontal disposition. Thereafter the sheet is conducted through an enclosed annealing lehr 17 on a series of spaced horizontally aligned rolls 18 wherein it is subjected to controlled cooling prior to being cut into blanks of the desired size.

The draw pot or working receptacle 11 has a floor 19, rear wall 20, oppositely disposed side walls 21 (FIG. 2) and is supported on a plurality of pot stools 22. A pot chamber 23 having side walls 24 and an end wall 25 is situated beneath and around the draw pot. Heat to assist in maintaining the molten glass in the draw pot at the desired working temperature is normally supplied to the pot chamber by direct fire from conventional gas or oil burners mounted in ports (not shown) in the side walls 24 and end wall 25.

A substantially enclosed drawing chamber 26, defined by spaced side walls 27 and a roof 28 and separated from the cooling chamber by an end wall or arch 29, is located over the draw pot 11 to provide a quiescent atmosphere over the molten glass therein and surrounding the newly formed sheet. Maintenance of a quiescent atmosphere in this area is an important factor in maintaining temperature uniformity across the surface of the molten glass. This consideration is of particular importance in the vicinity of the meniscus 15 where the sheet is drawn because it is well known that a lack of temperature uniformity in this area causes undesirable variations in thickness across the sheet which result in distorted viewing qualities in the ultimate product.

To further reduce loss of heat from the pool of molten glass 12 in the draw pot 11 and shield the same from undesirable convective air currents within the drawing chamber 26, a front lip-tile 30 is positioned over the molten glass adjacent the arch 29 and a rear lip-tile 31 is similarly positioned in the vicinity of the rear pot wall 20. Coolers 32 flank the newly drawn sheet to absorb heat therefrom so as to cause the initial setting of the sheet, and pairs of knurled width-maintaining rolls 33 conventionally engage the sheet along either marginal edge just above the meniscus to hold it to the desired width and overcome its natural tendency to narrow to a thread when drawn.

As previously discussed, during the operation of the process molten glass in the area adjacent the rear pot wall 20 exhibits a tendency to overcool and devitrify, building up along the rear wall and ultimately adversely affecting the quality of the sheet. Although the drawing chamber 26 is normally sealed from the pot chamber 23 along the sides thereof by cover or cap blocks 34 (FIG. 2), in order to prevent devitrification along the rear pot wall 20, hot combustion gases generated in the pot chamber may be allowed to circulate over the rear pot wall, across the rear portion of the draw pot. While they serve to prevent devitrification of the molten glass within the draw pot by reheating the glass adjacent the rear pot wall, these gases carry with them quantities of dirt and themselves create turbulent conditions within the drawing chamber which also adversely affect the quality of the drawn sheet, thereby severely limiting any advantage gained in preventing devitrification. Although this problem has been partially overcome by providing an auxiliary source of heat in the vicinity of the rear pot wall above the molten glass, thus allowing the opening between the top of the rear pot wall and the lip-tile to be sealed, the tiles heretofore used have been observed to deflect excessively and crack during use. This has resulted in loss of the seal and has required frequent replacement of the tiles which seriously hampers the efficiency of the process.

According to the present invention, the problem of deflection and cracking of the lip-tile is successfully overcome without sacrificing any of the advantages gained in sealing the drawing chamber 26 from the pot chamber 23. As shown generally in FIGS. 1–4, this is accomplished by providing a segmented rear lip-tile 31 suspendably supported from a separate structure, indicated generally at 35, and a seal 36 to be described hereafter in greater detail.

Figure 3:
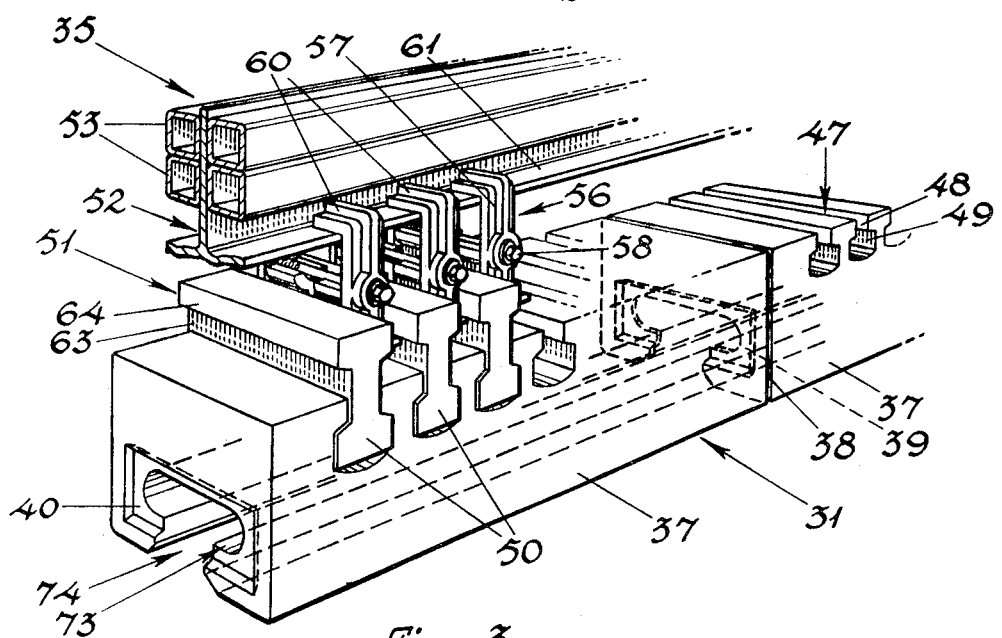
FIG. 3 is an enlarged fragmentary perspective view of the lip-tile and mounting.

As best seen in FIGS. 2 and 3, the lip-tile 31 is comprised of a plurality of individual axially aligned segments 37 with interfitting joints 38 which include tongues 39 and mating grooves 40. These joints are rendered gas tight by applying a compressive force at either end of the mounted tile 31. As shown in FIGS. 2 and 4, this may be accomplished by providing a plurality of spring-loaded bolts 41 free to move axially in and out of aligned openings in the flanges 42 of vertical support members 43 (which may be conventional structural channels at either side of the chamber). Thus, the bolts 41 have axial springs 44 held by threadably attached nuts 45 located intermediate the flanges such that, as the nuts are tightened, the corresponding springs are compressed and the reaction forces the bolt 41 against corresponding bearing plates 46 provided at either end of the lip-tile 31. The resilience of the spring also allows some degree of axial movement, without loss of the gas tight quality of the joints, for example, during expansion and contraction of the lip-tile segments.

The use of a plurality of segments free to expand or contract individually prevents the warping and cracking associated with longer or single-block lip-tiles, by alleviating the thermal stresses which result from any unequal heating along the length of or across the lip-tile. Also, the smaller size of the segments makes them far easier to cast and cure and to handle when being installed or removed from the working area of the furnace.

The upper portion of each of the lip-tile segments 37 is provided with a series of transverse, spaced recesses 47 having reduced throat sections 48 and shaped cavities 49 adapted to slidably receive similarly shaped flanged sections 50 of refractory suspension blocks 51. The suspension blocks carry the tile segments in a manner to be hereinafter discussed in greater detail.

The upper lip-tile support system of the invention contemplates a main horizontal structural beam 52 held between longer parallel, horizontally disposed tubular sections 53 which, in turn, are supported at either end outside of the chamber 26 as by plates 54 affixed to the vertical support members 43. The tubular sections 53 (which may be lengths of standard rectangular structural steel tubing) are closed at both ends and provided with connections 55 (FIG. 2). During normal operation a fluid cooling medium such as water is circulated therethrough in a conventional manner to cool both the tubular sections and the main support beam 52. The tubular sections may be interconnected in pairs to provide a double pass system with inlet and outlet connections on the same side of the chamber, or connected singly in a one pass system with connections on both sides as illustrated in FIG. 2. Such cooling prevents the loss of strength in and warpage of both the tubular sections and the main support beam associated with the high environmental temperature within the furnace chamber.

The lip-tile segments 37 with the suspension blocks 51 are made to depend from the main support member 52 as by means of conventional hangers 56. Each of the hangers 56 has a pair of identical oppositely disposed carrier members 57 joined by a removable bolt 58 and nut 59 (FIG. 5). The carrier members, in turn, have upper portions 60 turned inward at approximately right angles extending toward each other and adapted to engage the flange 61 of the main support beam 52 (FIGS. 3-5), when installed. Lower inverted T-shaped portions 62 of the carrier members (FIG. 2) extending longitudinally of the main beam are adapted to span the gap between webs 63 of the spaced suspension blocks 51 and engage the underside of upper flanges 64 thereof. The T-shaped portions 62 are also extended laterally (FIG. 5) to provide a greater support area along the flanges 64 and to space the oppositely disposed carrier members 57 along the bolt 58. Thus, by means of the hanger assemblies 56 and the suspension blocks 51, the segments 37 are made to depend evenly from the beam 52 without any bending stress being put on the segments.

The main beam 52 is rigidly fixed to and carried by the rectangular tubular sections 53 in a conventional manner and sized to absorb the bending movement caused by the weight of the tile segments 37 and fixtures with very little deflection. The rectangular tubular sections, in turn, distribute the load to the vertical support members 43 without the chamber. This allows the tile segments 37 to be supported in place across the chamber with very little deviation from the horizontal using a minimum size main beam 52.

The lip-tile segments themselves, along with the suspension blocks 51, may be cast of any refractory material suitable for the temperature and service required. The hanger components may be made of any suitable heat-resisting material such as a stainless steel alloy. Water cooling allows the structural beam and rectangular tubular sections to be made of conventional carbon steel.

As shown in FIG. 1, a channel-shaped member 65 is positioned atop the rear pot wall 20, and spans the entire width thereof between a pair of side blocks 66 (FIG. 2) resting on the cover blocks 34. The channel-shaped member 65 has a vertically disposed leg 67 extending upward toward a bottom floor block 68 of the chamber 17, a horizontally disposed web 69, and a second, shorter leg 70 extending upwardly to form a shallow pocket 71 containing a quantity of dry sealing medium 72, which may be sand or similar granular material. The seal is effectuated by the edge of the lip-tile 31 engaging the sealing medium 72. The vertical extension of the leg 67 allows the sealing medium 72 rearward of the lip-tile 31 to be retained above the level of the bottom of the lip-tile, lending vertical depth to the seal. In this manner, any slight variances between the level of the bottom of the several lip-tile segments do not prevent an effective seal from being maintained as the mobility of the sealing medium will compensate for such variations. Although not shown in the drawings, leaks which might otherwise occur between the channel-shaped member 65 and the refractory rear pot wall 20 may be prevented by placing a layer of compressible ceramic fiber material therebetween. An example of such material is Fiberfrax, manufactured by the Carborundum Company of Niagara Falls, New York. Thus, another advantage of the present invention lies in the provision of a seal which is dependent on neither the weight of the lip-tile bearing against a second surface nor a sealing block having completely level horizontal surfaces. At the same time, the seal of the present invention prevents the intrusion of dirt and turbulent gases into the drawing chamber.

For radiating heat directly to the surface of the glass in the area adjacent the rear draw pot wall 20, the lip-tile segments 37 are provided with congruent elongated recesses 73 in the lower face thereof which have reduced throat sections 74 and are adapted to contain an auxiliary electrical resistance heating element such as the serpentine element 75 (FIG. 6) which may be retained in place at several locations as by pins 76. The element extends across the draw pot and is connected to a source of electrical energy in a conventional manner (not shown).

The cross section of the heating element, and therefore its electrical resistance, is normally kept constant throughout its length, thus providing an extremely uniform source of heat across the draw pot. This uniform heat source just above the draw pot will prevent devitrification of the molten glass along the rear pot wall and tend to decrease temperature differentials across the draw pot as the colder, more viscous areas will absorb heat at a greater rate than those at higher temperatures. Where furnaces evidence large temperature differentials across the draw pot which cannot be eliminated by a uniform source of heat, the cross sectional area of the element may be increase or decreased or the spacing between convolutions of the element may be varied to provide a corresponding increase or decrease in the amount of heat applied to the molten glass in a given area to overcome such differentials. This feature may be of particular benefit in the areas adjacent the side walls to counteract the increased amount of heat losses from the chamber at these points.

The elements themselves may be made of any resistance heating material suitable for use in the high temperature environment involved. An example of a material which has been used successfully is "Hoskins Alloy 875" produced by the Hoskins Manufacturing Company of Detroit, Michigan. The elements are preferably of a relatively heavy cross section to prolong their operating life. The actual amount of electrical energy required to maintain the glass at the proper equilibrium working temperature must be determined by the required operating conditions. However, this has generally been found to be in the neighborhood of 40 kw. If desired, for safety requirements, it is contemplated that the elements may be designed to operate on low voltages of the order of 100 volts or less.

Although other forms are contemplated, the heating element 75 is preferably serpentine in configuration as described above in order to increase its effective heating area across the draw pot and to provide a more uniform heat distribution. The convolutions of the serpentine configuration readily absorb the relative changes in length between the heating element and the lip-tile caused by the unequal amounts of expansion of the two materials upon heating and cooling.

It is to be understood that the form of the invention herewith shown and described is to be taken as a preferred embodiment of the same, and the various changes in the shape, size and arrangement of parts may be resorted to without departing from the spirit of the invention.

I claim:

1. In a lip-tile for sheet glass furnaces, the improvement comprising an elongated support member, means extending along the support member for regulating the temperature of said support member throughout its length, a plurality of individual lip-tile sections disposed longitudinally beneath said support member in axially aligned end-to-end relationship, means engaging each of said individual lip-tile sections at a plurality of points spaced therealong and slidably suspending said lip-tile sections from said support member, and means bearing against the outer end of the end ones of said lip-tile sections resiliently urging said sections together.

2. A lip-tile for sheet glass furnaces as claimed in claim 1, wherein each of said lip-tile sections is formed with a continuous shaped bottom recess which with the other lip-tile sections forms a continuous recess therealong, said recess being open to said molten glass adjacent said rear pot wall, and adapted to contain an electric radiant heating element for supplying heat to the surface of the molten glass therebeneath and means supplying electrical energy thereto.

3. A lip-tile for sheet glass furnaces as claimed in claim 1, in which said elongated support member comprises a horizontally disposed flanged beam, said temperature regulating means comprising elongated, parallel tubular members extending along the web of said beam and outwardly beyond the extremes thereof, means supporting said parallel tubular members at each end, and means for circulating a heat absorbing medium through said tubular members, said means engaging and suspending said lip-tile sections comprising refractory hanging blocks suspended from spaced pairs of hangers which engage the bottom flange of said horizontally disposed beam, and said means resiliently urging said lip-tile sections together comprising a plurality of spring loaded members adapted to bear axially against plates at the outer end of said end lip-tile sections.

4. In apparatus for the continuous production of window glass including a draw pot containing a pool of molten glass, said draw pot being in end-to-end communication with a source of supply of said molten glass and having a rear wall and oppositely disposed sidewalls, a drawing chamber above and in communication with said draw pot, a pot chamber beneath said draw pot, means for introducing hot combustion gases into said pot chamber for heating said molten glass in said draw pot, and a lip-tile extending across the rear of said draw pot above said rear wall and molten glass, the improvement wherein said lip-tile comprises an elongated support member, means extending along the support member for regulating the temperature of said support member throughout its length, a plurality of individual lip-tile segments disposed longitudinally beneath said support member in axially aligned end-to-end relationship, means engaging each of said individual lip-tile segments at a plurality of points spaced therealong and slidably suspending said lip-tile segments from said support member, means bearing against the outer end of the end ones of said lip-tile segments resiliently urging said segments together, and sealing means horizontally disposed atop and extending the length of said rear pot wall cooperating with an edge of said lip-tile to form a seal between said drawing chamber and said pot chamber and prevent gases in said pot chamber from entering said drawing chamber over said rear wall.

5. Apparatus for the continuous production of window glass as claimed in claim 4, wherein said elongated support member includes a central structural beam member horizontally disposed across said drawing chamber and having a central vertical web, said beam member being carried by flanking tubular members which comprise said temperature regulating means, said tubular members extending beyond the ends of said structural beam member and being carried at each end by support means outside of said chamber, means for circulating a heat absorbing fluid through said tubular members, said structural beam member including a horizontally disposed bottom flange adapted to carry the weight of said lip-tile, a plurality of hangers positioned along said beam member from which said lip-tile segments are suspended, each of said hangers including a pair of carrier members having opposed inwardly directed horizontal components which overlay said flange on either side of said vertical web, and connector means securing each said pair of carrier members together.

6. Apparatus for the continuous production of window glass as claimed in claim 5, wherein each said lip-tile segment has a plurality of openings with reduced throat sections extending transversely thereof and arranged at spaced intervals therealong, and including refractory hanging blocks having corresponding flanged bottom portions received in said openings of said lip-tile segments, said refractory hanging blocks also having flanged top portions received between said pairs of carrier members.

7. Apparatus for the continuous production of window glass as claimed in claim 4, wherein said lip-tile segments have axial interfitting tongue and groove joints, and wherein said means urging said segments together comprises a plurality of spring loaded adjusting bolts bearing against plates fixed to the outward ends of the end ones of said lip-tile segments.

8. Apparatus for the continuous production of window glass as claimed in claim 4, wherein said sealing means includes an upwardly opening channel-shaped member horizontally disposed atop and extending along the length of said rear pot wall at least partially beneath said lip-tile, the rear leg of said channel-shaped member extending upwardly behind said lip-tile, and a loose granular material within the recess of said channel-shaped member and extending upwardly behind said lip-tile thereby forming a seal with said lip-tile.

9. Apparatus for the continuous production of window glass as claimed in claim 4, including a longitudinally extending recess in the bottom wall of each said segment forming with said other lip-tile segments a continuous recess along said lip-tile, an electric resistance heating element disposed within said recess, and means supplying electrical energy to said heating element for heating said molten glass along said rear pot wall.

* * * * *